Sept. 26, 1967 R. S. HEITKAMP 3,343,371
LOCKING DEVICE FOR ESTABLISHING A LOAD-BEARING
JOINT BETWEEN TWO STRUCTURES
Filed Jan. 25, 1965 6 Sheets-Sheet 1
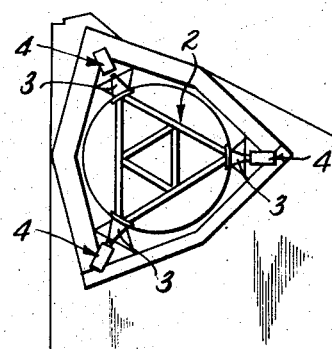
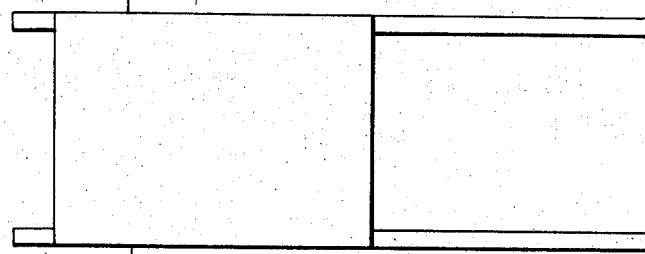
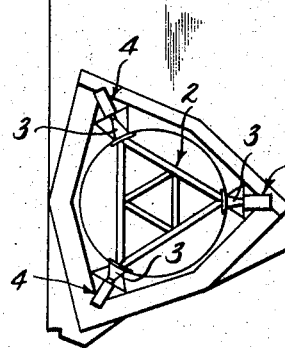
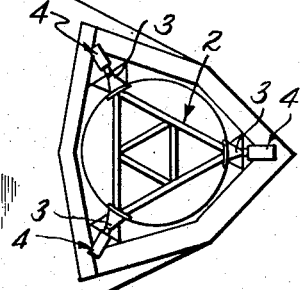
Fig. 1.
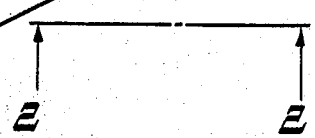
Fig. 12.
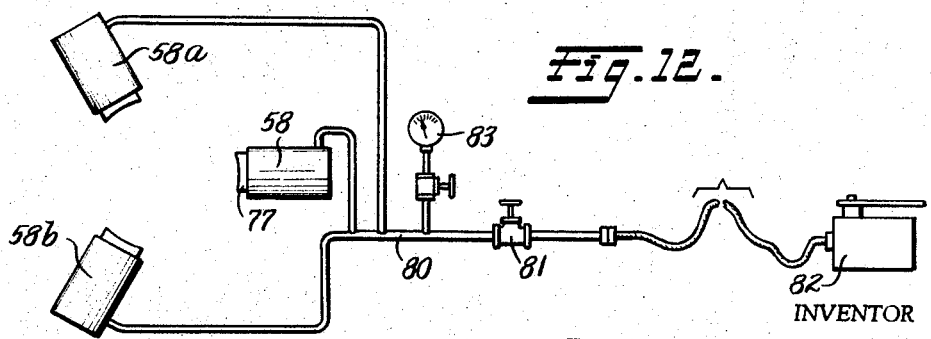
INVENTOR
ROY S. HEITKAMP
BY Arnold & Roylance
ATTORNEYS

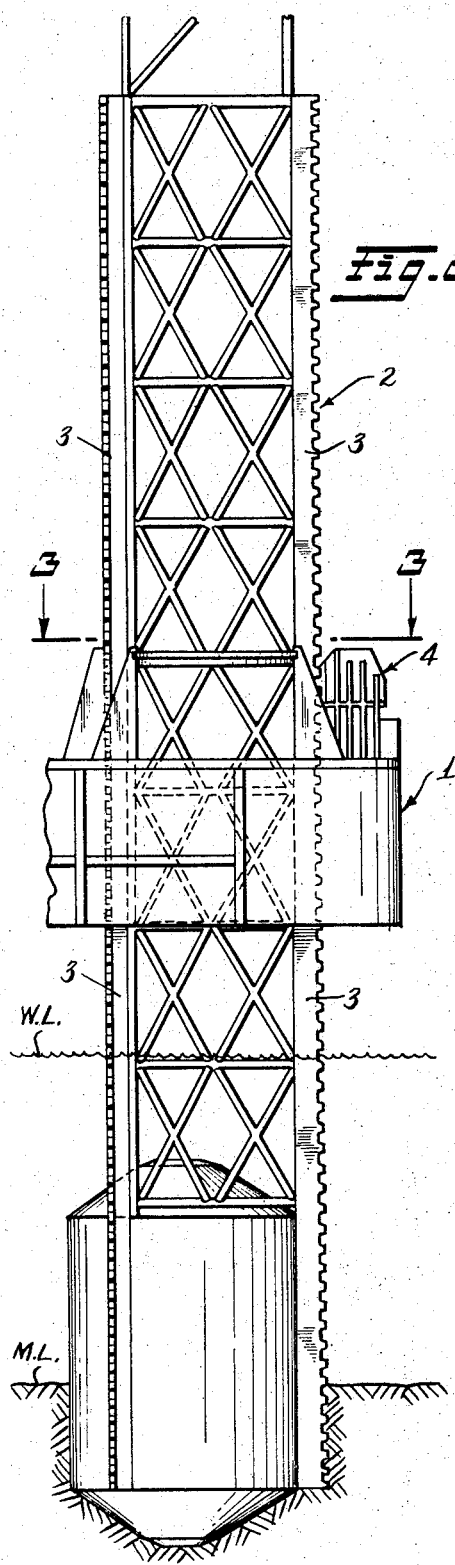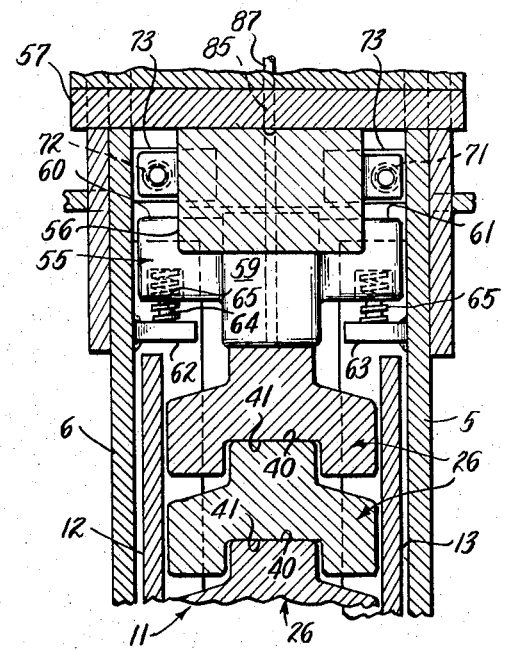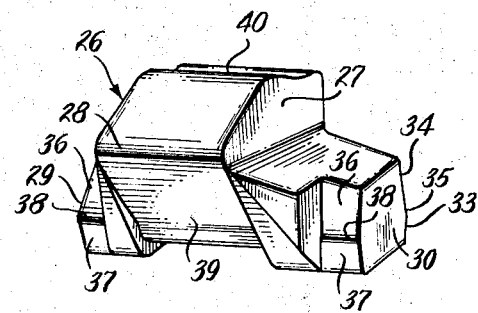

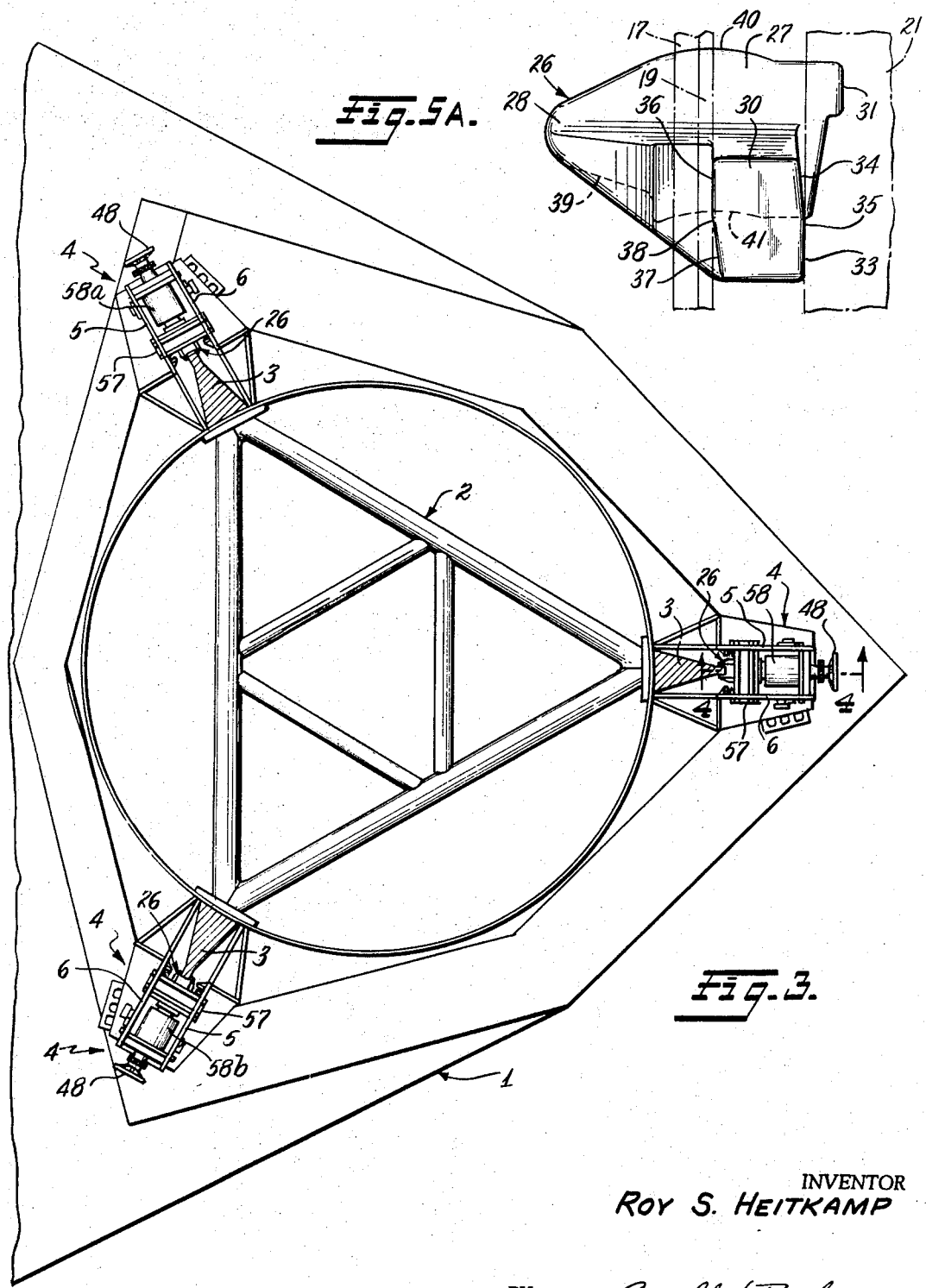

INVENTOR
ROY S. HEITKAMP

Sept. 26, 1967 R. S. HEITKAMP 3,343,371
LOCKING DEVICE FOR ESTABLISHING A LOAD-BEARING
JOINT BETWEEN TWO STRUCTURES
Filed Jan. 25, 1965 6 Sheets-Sheet 5

INVENTOR
ROY S. HEITKAMP

BY Arnold J. Roylance
ATTORNEYS

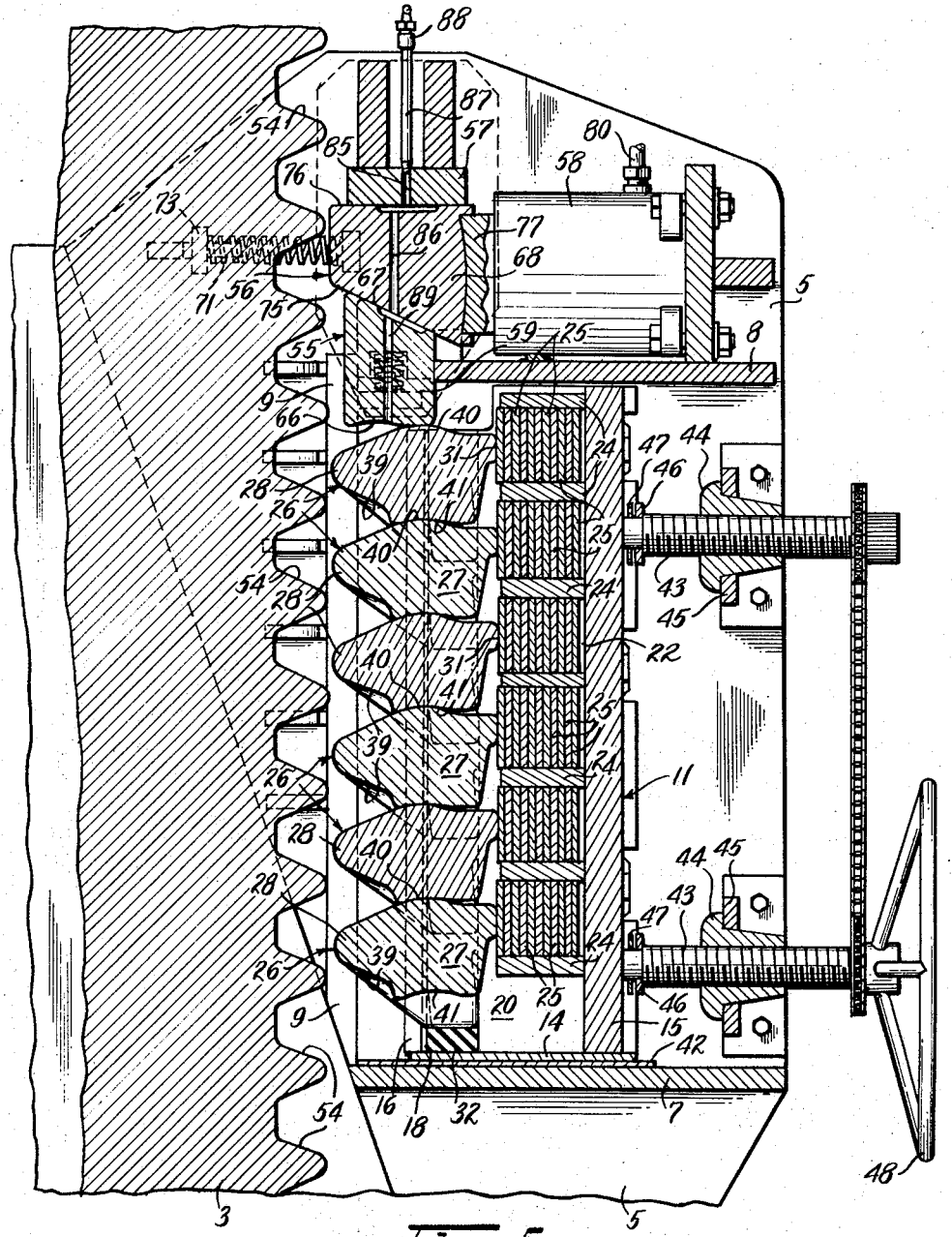

United States Patent Office 3,343,371
Patented Sept. 26, 1967

3,343,371
LOCKING DEVICE FOR ESTABLISHING A LOAD-BEARING JOINT BETWEEN TWO STRUCTURES
Roy S. Heitkamp, Metairie, La., assignor to J. Ray McDermott & Co., Inc., New Orleans, La., a corporation of Delaware
Filed Jan. 25, 1965, Ser. No. 427,687
18 Claims. (Cl. 61—46.5)

This invention relates to load supporting structures and particularly to improved devices for releasably locking together two members, or two structural assemblies, to provide a load-bearing joint capable of withstanding very high loads.

Though the invention has many other applications, it is especially useful for locking an offshore platform structure, for example, to its supporting legs. In offshore well operations, it is common practice to employ platforms supported at or above the water level by a plurality of vertical legs extending upwardly from the marine floor. Typically, such platforms may support the machinery and equipment for drilling a well and also provide quarters for personnel. The platforms themselves are accordingly large and hevy, and must support the additional great weight of drilling equipment and the like.

Further, it is desirable that the platform be adjustable vertically relative to the supporting legs, and various "self-elevating" platforms have been devised and installed. Various jacking or driving arrangements have been employed to adjust the vertical position of the platform relative to the legs, one such arrangement including heavy pinions carried by the platform and meshed with rack teeth on the legs, the pinions being driven by an electric motor through a suitable gear box. Structures of this type are disclosed, for example, in U.S. Patents 3,011,467 and 3,044,269, issued Dec. 5, 1961, and July 17, 1962, respectively, to R. G. LeTourneau. In such systems, it has been proposed that, once the platform has been adjusted to the desired position, the pinions then be locked against rotation so that the racks and pinions will then constitute the load-bearing connections between the platform and the legs. At least in certain types of installations, however, the loads involved cannot be supported safely by the rack-an-pinion connections and the problem of providing an additional locking device has arisen.

A general object of the invention is to provide a releasable locking device which can be employed to effect a joint between two members or structural assemblies, with the joint being capable of bearing extremely heavy loads.

Another object is to devise a rack-and-tooth type of locking device wherein loads applied axially relative to the rack are distributed uniformly over a plurality of teeth.

A further object is to provide a rack-and-tooth type of locking device which can be actuated to engaged condition by a suitable power device in such fashion that a plurality of the locking devices can be arranged for simultaneous actuation under the control of a single control device.

In order that the manner in which the foregoing and other objects are attained in accordance with the invention can be understood in detail, one advantageous embodiment thereof will be described with reference to the accompanying drawings, which form a part of the specification, and wherein:

FIG. 1 is a top plan view of an offshore platform embodying releasable locking devices constructed in accordance with the invention;

FIG. 2 is a fragmentary side elevational view of a portion of the platform of FIG. 1, viewed as indicated by line 2—2, FIG. 1;

FIG. 3 is a transverse sectional view taken on line 3—3, FIG. 2, showing some parts in elevation;

FIG. 5 is a vertical sectional view similar to FIG. 4 but showing the locking device in its released position;

FIG. 5A is a semi-diagrammatic view illustrating the relation of one of the locking teeth of the device of FIG. 4 to the support means therefor;

FIG. 9 is a fragmentary vertical sectional view taken on line 9—9, FIG. 4;

FIG. 10 is a perspective view of one of the locking teeth employed in the device of FIG. 4;

FIG. 11 is a perspective view of one of the leaf spring elements employed in the device of FIG. 4; and FIG. 12 is a schematice diagram of a hydraulic system connected for operation of three of the locking devices embodied in the platform of FIG. 1.

Figure 4:
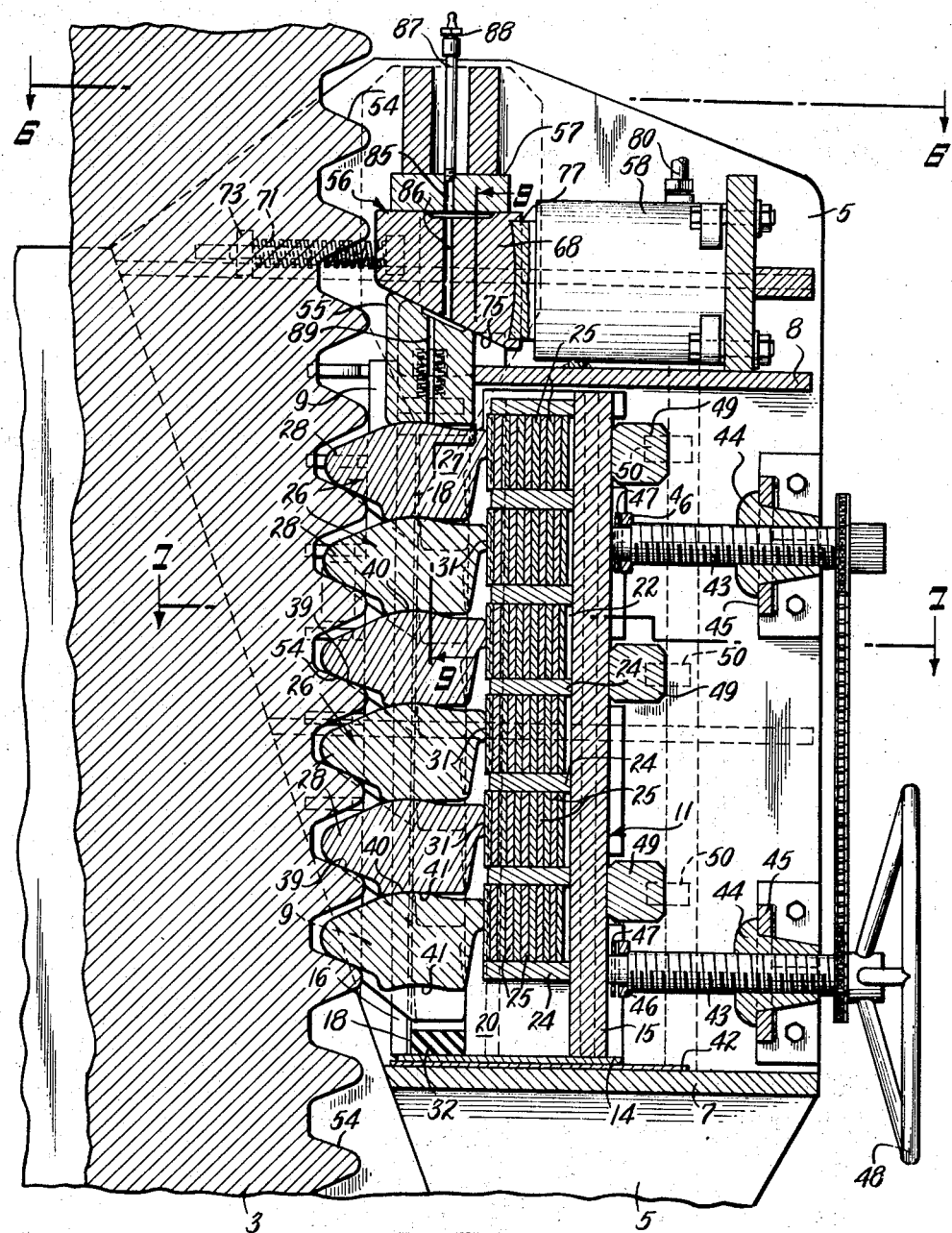
FIG. 4 is a vertical sectional view of a releasable locking device constructed in accordance with one embodiment of the invention, taken on line 4—4, FIG. 3, and showing the locking device in its engaged position.
Figure 6:
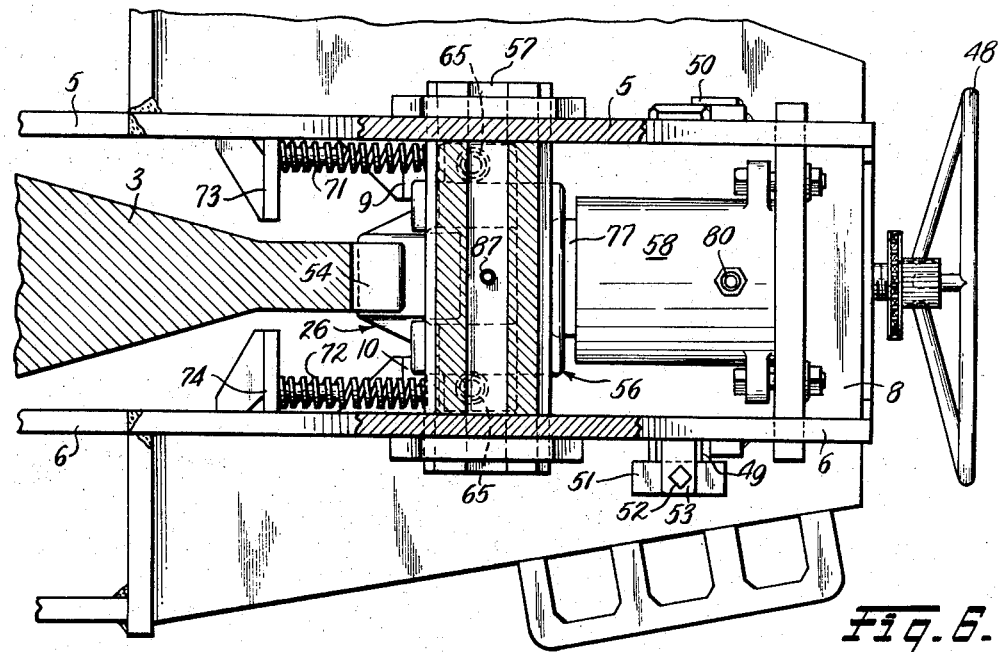
FIG. 6 is a transverse sectional view taken on line 6—6, FIG. 4.

Referring now to the drawings in detail, the invention will be described as employed to secure a horizontal platform structure 1 to three triangularly spaced vertical legs 2. Typically, the platform structure and legs can constitute a self-elevating offshore drilling platform of the general type described in the aforementioned Patents 3,011,467 and 3,044,269, each leg 2 being equipped with three vertically extending rack members 3 to cooperate with motor driven pinions (not shown) for raising and lowering the platform structure 1 relative to the legs 2.

In order to lock the platform structure 1 positively to legs 2 once the desired adjusted position of the platform structure has been attained, the platform structure is equipped with a plurality of locking devices, indicated generally at 4, each cooperating with a different one of the rack members 3. As will be clear from FIGS. 3–7, each locking device 4 includes a frame structure fixed to the platform structure and comprising vertical side plates 5 and 6, a lower horizontal plate 7, and an upper horizontal plate 8. Immediately adjacent the rack member 3, vertical stop bars 9 and 10 are secured to the inner faces of the side plates 5 and 6.

The frame structure for each locking device accommodates a support, indicated generally at 11, in the nature of an upright rectangular housing or carriage comprising side walls 12 and 13, a bottom member 14, and a relatively thick back plate 15, all welded or otherwise rigidly secured together to define an elongated rectangular space which extends parallel to the rack member 3 and opens toward the rack member and is also open at the top. Flange members 16 and 17 are secured to the front edges of side walls 12 and 13, the flange members lying in a common plane parallel to the back plate and projecting toward each other through short equal distances. Wear strips 18 and 19, thinner than flanges 16 and 17 and formed of a suitable material such as low carbon case hardened cold drawn steel, are welded to the back surfaces of flanges 16 and 17, respectively. Two flat plates 20 and 21 are secured each to the inner face of a different one of the side walls 12 and 13 and extend from the bottom member 14 to the top edges of the side walls. Plates 20 and 21 are of the same width and narrower than side walls 12 and 13, the rear edges of plates 20 and 21 abutting the front face of back plate 15 and the front edges of plates 20 and 21 being spaced rearwardly from wear strips 18 and 19. Two identical strips 22 and 23 are secured to the front face of back plate 15, each extending vertically along the rear edge portion of a different one of the plates 20 and 21. Strips 22 and 23 can be of the same material as wear strips 18 and 19 and serve as fulcrum members for the leaf springs later described.

A plurality of horizontal partition members 24 extend between plates 20 and 21 and are secured thereto, members 24 being spaced apart vertically to divide the space between plates 20 and 21 into a plurality of forwardly opening spring-accommodating chambers. The rear corner portions of members 24 are cut away to accommodate strips 18 and 19. In the space between each adjacent pair of partition members 24, there are disposed a plurality of normally flat leaf spring members 25, FIG. 11, the thickness and number of the leaf spring members being such that, with the spring members in face-to-face engagement and with the rearmost one thereof engaging strips 22 and 23, the front spring member is adjacent the front edges of plates 20 and 21. Thus, when the spring members of each set are in normal or relaxed condition, the central portion of the rearmost one of the spring members is spaced forwardly from back plate 15 by the thickness of strips 22, 23, and the spring members can therefore be resiliently deformed or bowed when a rearwardly directed force is applied to the center of the front spring member.

The space defined by housing 11 in front of the spring chambers accommodates a plurality of identical unitary locking teeth 26, FIGS. 4, 7, 9 and 10. Each locking tooth is cast as an integral piece from a suitable metal, such as manganese steel, and includes a body 27 from which project a nose portion 28, two transversely aligned oppositely projecting side portions 29 and 30, and a spring abutting portion 31. Considering the length of the tooth as extending from portion 31 to the tip of nose portion 28, and the width thereof as extending parallel to portions 29 and 30, then nose portion 28 has a maximum width such as to pass freely through the space between flanges 16 and 17. The distance between the ends of portions 29 and 30 is only slightly less than the spacing between side walls 12 and 13.

Figure 7:
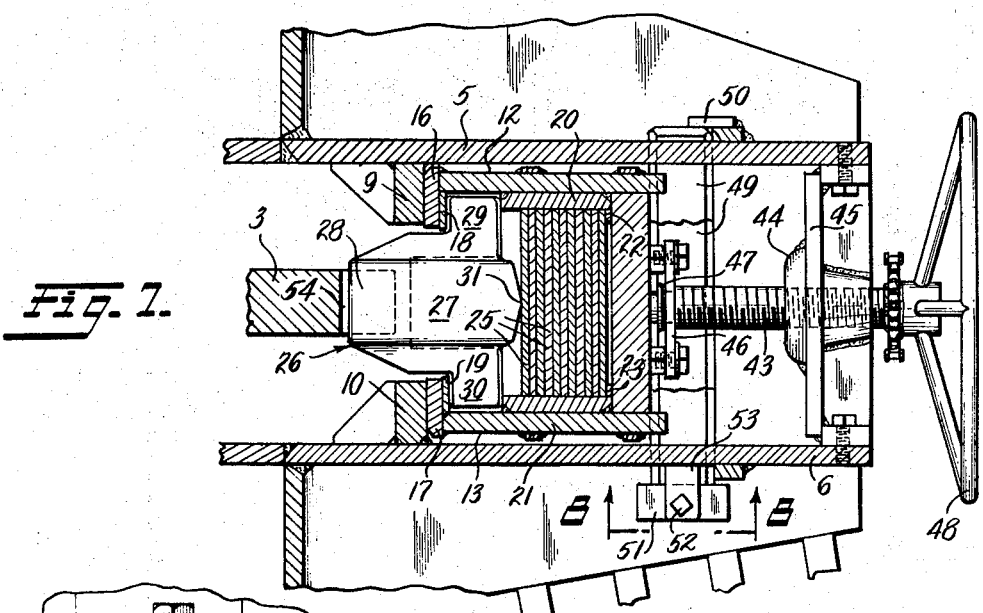
FIG. 7 is a transverse sectional view taken on line 7—7, FIG. 4.

As best seen in FIGS. 7 and 9, the side portion 29 is accommodated in the space between wear strip 18 and plate 20, while the side portion 30 is accommodated in the space between wear strip 19 and plate 21. The spaces are in the nature of vertical guide slots and are open at their tops, so that the teeth 26 can be inserted downwardly, the lowermost tooth 26 coming to rest on a resilient cushion member 32, FIG. 5, of suitable synthetic rubber, which is secured to the upper face of bottom member 14. As seen in FIG. 5A, portions 29 and 30 of each locking tooth have flat lower rear faces 33 which can be in flush engagement with the respective front edges of plates 20 and 21 when the tooth is disposed in the housing. Above faces 33, portions 29 and 30 each have flat upper rear faces 34 which are inclined forwardly and upwardly and join faces 33 in an obtuse corner 35. The front of each portion 29, 30 is defined by an upper face 36 and a lower, downwardly and rearwardly slanting face 37 which joint in an obtuse corner 38, face 36 being parallel to face 33.

With tooth 26 in the position seen in FIG. 5, the main body 27 of the tooth is disposed above the axis defined by corners 35. The spring abutting portion 31 is at the top of the tooth, and therefore can be considered as spaced by a significant distance from the axis defined by corners 35 and to be angularly displaced about that axis from the nose portion 28. The nose portion 28 includes a lower face 39 which is inclined downwardly and rearwardly from the tip of the nose portion. The body 27 includes a convex upper surface portion 40 which is a portion of a cylindrical surface with the axis defined by corners 38 as the center of curvature. Body 27 also includes a concave lower surface portion 41 which is a portion of a cylindrical surface of a substantially larger radius of curvature than portion 40. Surface portion 40 is centered below surface portion 41. Accordingly, when the teeth 26 are properly inserted downwardly into housing 11 one after another, upper surface portion 40 of one tooth comes into engagement with lower surface portion 41 of the next higher tooth in the resulting vertical series of teeth.

As seen in FIG. 7, the plan shape of the locking tooth is such that spring abutting portion 31 is rearwardly tapering and centrally located, so as to engage only the central portion of the appropriate forwardly exposed leaf spring member 25.

The relation of teeth 26 to housing 11 is such that each tooth 26 can pivot about the horizontal axis defined by engagement of corners 35 with the front edges of plates 20 and 21. Assuming that a force is applied to any of the teeth 26 tending to pivot the same in a clockwise direction, as viewed in FIG. 5, the resulting pivotal motion is opposed by action of the assembly of leaf spring members 25 engaged by portion 31 of that tooth. Limited pivotal movement of the unitary teeth 26 can occur even though the surface portions 40 and 41 of adjacent teeeth are in engagement since surface portion 40 is of the smaller radius of curvature and can therefore ride along the appropriate, more gently curving, surface portion 41, and such sliding action is possible even though the axes of curvature of surface portions 40 and 41 are spaced forwardly from the pivotal axis defined by corners 35. In this connection, it will be noted that surface portions 40, 41 are approximately centered relative to the length of tooth 26 so that loads applied vertically to the series of locking teeth are most effectively transferred from tooth to tooth in the series.

Considering FIGS. 4, 5 and 7, it will be seen that the housing 11 is free to move horizontally within its supporting frame structure between a first position (FIG. 5), in which the locking teeth are out of engagement with rack 3, and a second position (FIG. 4), in which the locking teeth 26 are each engaged between an adjacent pair of the teeth of rack 3. To facilitate the rectilinear movement of housing 11 between these two positions, a slide bearing plate 42, of brass or the like, is secured to the top of horizontal frame plate 7. The second position for the housing is positively determined by the location of stop bars 9 and 10 which are engaged by the flange members 16 and 17 of the housing. Movement of the housing is accomplished by the horizontal jack screws 43, FIG. 4, which are engaged through nut members 44 carried by bars 45, the bars being secured at their ends to the side plates 5 and 6 of the frame. The tips of the jack screws are disposed for direct engagement with the rear face of the back plate 15 when the screws are operated to drive the housing toward the rack. Adjacent the back plate, the jack screws extend through openings in bars 46 which are mounted on and spaced rearwardly from back plate 15, rings 47 being secured to the tips of the jack screws to engage bars 46 and cause the housing to be pulled to its retracted position when the jack screws are turned in the proper direction. A hand wheel 48 is secured to one of the jack screws, and the two screws are interconnected by a chain and sprocket drive, as seen in FIG. 4, for simultaneous rotation when the hand wheel is turned.

Figure 8:
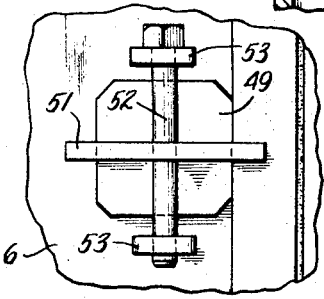
FIG. 8 is a fragmentary side elevational view as indicated by line 8—8, FIG. 7.

To secure the housing 11 in its second position, three locking bars 49 are inserted through transversely aligned openings in the side plates 5 and 6 of the frame, the openings being so located that bars 49 will engage behind the rear face of back plate 15 when flange members 16 and 17 engage stop bars 9 and 10, respectively. One end of each bar 49 engages a stop 50 secured to side plate 5. At its other end, each bar 49 has welded thereto a plate 51 provided with an opening to accommodate a retaining pin 52 which extends through aligned openings in ears 53, FIG. 8, secured to side plate 6.

The nose portions 28 of locking teeth 26 are dimensioned for insertion between any adjacent pair of teeth on rack 3, and the vertical thickness of body portions 27 of the locking teeth is such that, when the locking teeth are arranged in the vertical series seen in FIG. 5, proper alignment of one locking tooth relative to the teeth of the rack will result in similar proper alignment of all of the other locking teeth in the series. Comparing FIGS. 4 and 5, it will be understood that, as housing 11 is driven toward rack 3 by the action of jack screws 43, the nose portion 28 of each locking tooth 26 engages over the upper face 54 of one of the teeth of rack 3 and, as movement of the housing progresses, the locking tooth is pivoted in a clockwise direction (as viewed in FIGS. 4 and 5), about the axis defined by corners 35, and against the resilient opposition afforded by the leaf spring assembly until the load-bearing surface 39 of the nose portion of the locking tooth is in flush engagement with the face 54 of the rack tooth. Such pivotal action of each locking tooth 26 is independent since the unitary locking teeth are mutually interrelated only by the engagement of surface portions 40 and 41. Hence, each locking tooth is automatically adjusted for proper engagement with the particular one of the teeth of rack 3 to which it is related.

So far as the mechanism involving locking teeth 26 has as yet been described, the series of locking teeth has freedom of vertical movement relative to the housing 11. To apply a downwardly directed axial load to the locking teeth, there is employed a power actuated loading means comprising a floating anvil 55, a wedge 56, an upper guide member 57 and a hydraulically operated actuating motor 58, FIGS. 5, 6 and 9.

Anvil 55 has a central body 59 and oppositely projecting side portions 60 and 61, the distance between the free ends of side portions 60, 61 being slightly smaller than the spacing between side frame plates 5 and 6 so that the anvil can be accommodated between the side plates at a point immediately above housing 11. Brackets 62 and 63, FIG. 9, are secured respectively to and project inwardly from side plates 5 and 6, each bracket having an upright pin 64 to position a helical compression spring 65 which surrounds the pin. Side portions 60 and 61 are disposed above brackets 62 and 63, respectively, and are provided with downwardly opening sockets to receive the springs 65. The bottom of body 59 has a cylindrically curved downwardly concave surface portion 66 adapted for flush engagement with the upper surface portion 40 of the uppermost locking tooth. The top surface 67 of body 59 is flat and inclined forwardly and upwardly.

Wedge 56 has a central body portion 68 and oppositely projecting side portions 69 and 70. At its front face, each side portion 69 and 70 carries a forwardly projecting pin, the pins being engaged respectively in one end of compression springs 71 and 72, FIG. 6. The other ends of springs 71 and 72 are fixedly retained by brackets 73 and 74, respectively, which are carried by side plates 5 and 6. The bottom surface 75 of body 68 is flat and downwardly and rearwardly inclined, surfaces 75 and 67 being in flush sliding engagement with each other. The top surface 76 of body 68 is flat and horizontal, being in sliding engagement with the bottom surface of guide member 57. Guide member 57 extends between and is rigidly carried by the side frame plates 5 and 6. The back of wedge 56 is recessed to accommodate the driven element 77 of motor 58, the motor being rigidly mounted on upper horizontal frame plate 8.

As seen in FIG. 12, the expansible chamber of motor 58 is connected via conduit 80 and shut-off valve 81 to a conventional hydraulic pump 82 capable of providing fluid under high pressure. The motors 58a and 58b of the locking devices 4 associated with the other two racks of the leg 2 are connected to pump 82 in parallel with motor 58, so that the pump can supply pressure fluid to all three locking devices simultaneously. A pressure gauge 83 is connected to conduit 80 at a point between valve 81 and motors 58–58b.

Assuming that housing 11 has been advanced to its second position and locked therein by bars 49, so that the locking teeth 26 are engaged with rack 3 as seen in FIG. 4, pump 82 is energized, supplying pressure to motor 58 and causing the motor to drive wedge 56 toward the rack 3. Such movement of wedge 56 forces anvil 55 downwardly. Since surface portion 66 of the anvil is directly engaged with surface portion 40 of the uppermost locking tooth 26, a downwardly acting axial load is applied to the series of locking teeth. When gauge 83 indicates that a predetermined fluid pressure has been attained, valve 81 is closed, so that such pressure is constantly maintained at motor 58 and the axial load on the locking teeth is maintained.

When the locking device is to be disengaged from the rack, valve 81 is first opened to relieve the fluid pressure at motor 58 and allow spring 71 and 72 to shift wedge 56 away from the rack 3, so that the axial load is removed from locking teeth 26. Bars 49 are then removed and hand wheel 48 is rotated to turn jack screws 43 in a direction causing housing 11 to be shifted to its retracted position, seen in FIG. 5.

To assure free sliding engagement between anvil 55, wedge 56 and guide 57, lubricating ducts 85 and 86 are provided in guide 57 and wedge 56, respectively, and a lubricant supply conduit 87, equipped with a suitable fitting 88, is connected to duct 85. An additional lubricating duct 89 extends vertically through the body 59 of anvil 55 to supply lubricant to surface 66 and the tooth surface 40 with which the same is engaged.

From the foregoing, it will be clear that, during engagement of the locking device 4 with the rack 3, each locking tooth 26 is allowed a limited degree of pivotal movement in such fashion that the locking tooth can adjust automatically to that position which effects proper engagement between the load-bearing surfaces 39 and 54. Because the locking teeth are unitary and mutually independent, save for engagement between the axially directed surfaces 40 and 41, such pivotal movement can occur to a slightly different degree for each tooth, in accordance with the particular configuration of the various teeth of rack 3. The amount of pivotal movement of the locking teeth required is of course small, the spring devices constituted by each set of spring members 25 affording a very strong resistance against the pivotal movement. Once the locking teeth have all assumed their proper engaged positions relative to rack 3, application of the axial load to the series of locking teeth by the action of motor 58 and wedge 56 is effective to securely and rigidly clamp the locking teeth against movement axially relative to the series of teeth. The overall effect of this construction is to accomplish uniform distribution of loads occurring longitudinally of rack 3 over all of the locking teeth 26.

It will be understood that, the amount of pivotal movement of the locking teeth being small, the spring members 25 are distorted only to a relatively small extent, and for simplicity of illustration, such distortion has not been shown in FIGS. 5 and 7.

Locking devices in accordance with the invention, though especially useful for supporting offshore platforms and the like on vertical legs, can be employed in any application where it is necessary to establish an accurately located joint between two members or structures with the joint being capable of withstanding extremely heavy loads.

Though one particularly advantageous embodiment of the invention has been shown and described for illustrative purposes, it will be understood by those skilled in the art that various changes and modifications can be made therein, without departing from the scope of the invention as defined in the appended claims.

What is claimed is:

1. In a locking device of the type described, the combination of a rack having a series of rack teeth;
frame means disposed adjacent said rack;
support means mounted on said frame means for movement between a retracted position, in which said support means is spaced from said rack, and a second position, in which said support means is adjacent said rack;
a plurality of individual locking teeth carried by said support means and arranged in an elongated series which extends lengthwise of said rack when said support means is in said second position,
 each of said locking teeth having a nose portion dimensioned for insertion between an adjacent pair of said rack teeth, the nose portion of each of said locking teeth including a load-bearing surface disposed to engage one rack tooth of the pair of rack teeth between which the nose portion is inserted, said load-bearing surfaces of said locking teeth all facing generally toward the same end of said series,
 each of said locking teeth being carried by said support means for independent pivotal movement about a tooth axis extending transversely of said series,
 engagement of said load-bearing surfaces of said locking teeth with the respective ones of said rack teeth tending to cause said locking teeth each to rotate in one direction about its tooth axis;
yieldable means carried by said support means and disposed to be engaged by said locking teeth to resist pivotal movement of said locking teeth in said one direction;
means carried by said frame means for releasably locking said support means in said second position against movement away from said rack,
 said nose portions of said locking teeth all being engaged between said rack teeth when said support means is in said second position; and
loading means carried by said frame means and arranged to apply an axial load to said series of locking teeth in a direction toward the end of said series which is faced by said load-bearing surfaces,
 application of such axial load clamping said locking teeth against movement lengthwise of said series.

2. A locking device according to claim 1, wherein
each of said locking teeth includes an abutment surface spaced angularly about the tooth axis of such locking tooth from said load-bearing surface and disposed to move into engagement with said yieldable means when such locking tooth pivots in said one direction.

3. A locking device according to claim 2, wherein
said yielding means comprises a plurality of spring devices each associated with a different one of said locking teeth.

4. A locking device according to claim 1, wherein
each of said locking teeth includes a body portion from which said nose portion projects,
 said body portion of each of said locking teeth having first and second force-transmitting surfaces spaced from each other axially of said series and each facing a different end of said series,
 said first force-transmitting surface of each of said locking teeth being in engagement with said second force-transmitting surface of the next adjacent one of said locking teeth,
axial loading of said series of locking teeth by said loading means clamping said locking teeth together in mutual engagement.

5. A locking device according to claim 1, wherein
said load-bearing surface of each of said locking teeth is disposed at an angle, relative to the longitudinal axis of said series, such that movement of said support means from said retracted position into said second position, with attendant engagement of said load-bearing surfaces with the respective ones of said rack teeth, causes said locking teeth to be cammed pivotally in said one direction.

6. A locking device according to claim 1, wherein
said support means is a housing defining an elongated space extending parallel to and opening toward said rack when said housing is in said second position,
said series of locking teeth extending within said elongated space.

7. A locking device according to claim 6, wherein
said housing is mounted on said frame means for rectilinear movement between said retracted position and said second position.

8. A locking device according to claim 1, wherein
said loading means comprises a remotely operated power device.

9. A locking device according to claim 1, wherein
said support means defines two spaced slots parallel to each other and to said rack,
each of said locking teeth includes two oppositely extending lateral projections, and
said lateral projections of each of said locking teeth are engaged each in a different one of said slots.

10. A locking device according to claim 1, wherein
said support means comprises
 means presenting two elongated surfaces which are spaced apart transversely of said rack and lie in a common plane parallel to said rack, said elongated surfaces facing toward said rack, and
each of said locking teeth includes two portions each engaged with and capable of rocking on a different one of said elongated surfaces.

11. In a locking device of the type described, the combination of
an elongated housing;
a plurality of unitary locking teeth disposed in said housing and arranged in a series which extends lengthwise of said housing,
 each of said locking teeth including a nose portion, the nose portion of all of said teeth projecting in the same direction transversely of said housing,
 said housin gsupporting each of said locking teeth for limited pivotal movement about a tooth axis extending transversely relative to said nose portion of the tooth,
 each of said nose portions including a load-bearing surface and all of said load-bearing surfaces facing generally toward one end of said housing; and
means at the other end of said housing for applying to said series of locking teeth an axial load in a direction toward said one end of said housing,
application of such axial load clamping said locking teeth against movement lengthwise of said series.

12. In a locking device of the type described, the combination of
an elongated support;
a plurality of unitary locking teeth carried by said support and arranged in a series which extends longitudinally of said support
 said support supporting each of said teeth for pivotal movement about an axis extending transversely of said support, the pivotal axes of said teeth all being mutually parallel;
resilient means carried by said support and engageable by said teeth to resist pivotal movement thereof in one direction; and
means for applying an axial load to said series of teeth, operation of said means to apply said axial load clamping said locking teeth against movement longitudinally of said support.

13. In a device for positively locking a structure to a support equipped with a vertically extending rack, the combination of a vertically extending elongated housing;
a plurality of unitary locking teeth arranged in a vertical series in said housing,
   each of said teeth including a transversely projecting nose portion for engagement in the teeth of the rack,
   said locking teeth each being supported on said housing for limited pivotal movement about a horizontal axis, whereby said locking teeth can adjust for uniform engagement with the teeth of the rack; and
means for applying a downwardly acting axial load to said series of locking teeth to clamp said locking teeth against movement relative to said housing.

14. A device according to claim 13, wherein
said nose portion of each of said teeth has an inclined downwardly facing load bearing surface engageable with a tooth of the rack;
means mounting said housing for movement horizontally toward the rack to a position in which
   said load bearing surfaces engage the teeth of the rack;
engagement of said load bearing surfaces with the teeth of said rack camming said locking teeth pivotally about said horizontal axis to assure said uniform engagement.

15. A device according to claim 13, wherein
said means for applying a downwardly acting axial force comprises
   an anvil supported on said housing above the uppermost one of said locking teeth and having a force-transmitting surface engaged with said one tooth,
   a wedge member disposed above said anvil and mounted for rectilinear movement transversely of said housing, said wedge member having slidably engaged surfaces oriented to cause said anvil to be forced downwardly when said wedge member is moved in one direction transversely of said housing; and
   power means connected to said wedge member to drive the same in said one direction.

16. In a device of the type described for cooperating with a rack, the combination of
elongated support means adapted to be positioned parallel to the rack;
a plurality of locking teeth carried by said support means and arranged in a series which extends lengthwise of said support means, each of said locking teeth comprising
   a portion projecting transversely of said support means for engagement with the rack,
   a first surface directed toward one end of said series, and
   a second surface directed toward the other end of said series,
   said locking teeth being each supported by said support means for limited pivotal movement about a tooth axis extending transversely of said series, all of said tooth axes being parallel,
   said first surface of each of said locking teeth being disposed in slidable engagement with said second surface of the next adjacent one of said locking teeth in said series; and
means for applying an axial force to said series of locking teeth to clamp said locking teeth together against movement lengthwise of said support means.

17. A device according to claim 16, wherein
said first and second surfaces of said locking teeth are each portions of a cylindrical surface,
said first surface of each of said locking teeth is convex and said second surface is concave, and
said concave surface has a larger radius of curvature than said convex surface;
said convex and concave surfaces of one of said locking teeth sliding respectively on the concave surface of a first adjacent tooth and the convex surface of a second adjacent tooth during pivotal movement of the said one tooth.

18. In an offshore platform installation of the type comprising a plurality of vertical legs, a plurality of vertically extending racks each secured to one of the legs, and a platform structure to be supported by the legs, the combination of
a plurality of locking devices mounted on the platform structure and each disposed adjacent a different one of the racks, each of said locking devices comprising
   an upright elongated supporting means,
   a plurality of unitary locking teeth carried by said support means in a vertically extending series and each projecting from said support means for engagement with the teeth of the respective one of the racks,
   each of said locking teeth being arranged for limited pivotal movement about a horizontal axis, whereby each of said locking teeth can adjust automatically for proper engagement with the respective one of the rack teeth as the locking device is engaged with the rack,
   and power means arranged to apply a downwardly acting axial load to the series of said locking teeth to clamp said teeth against vertical movement relative to said supporting means, said power means comprising a fluid pressure-actuated motor;
a source of fluid under pressure;
conduit means connecting said source to the fluid pressure-actuated motors of all of said power means; and
control means operable to allow flow of pressure fluid simultaneously to all of said motors, whereby the series of locking teeth of all of said plurality of locking devices can be clamped simultaneously.

References Cited

UNITED STATES PATENTS 2,967,400  1/1961  Grant et al. _____ 61—46.5
2,970,445  2/1961  Suderow _____ 61—46.5
3,015,142  1/1962  Rosanoff et al. _____ 24—263.5

DAVID J. WILLIAMOWSKY, *Primary Examiner.*

JACOB SHAPIRO, *Assistant Examiner.*